(12) United States Patent
Bryant et al.

(10) Patent No.: US 11,560,181 B2
(45) Date of Patent: Jan. 24, 2023

(54) GROUNDS MAINTENANCE VEHICLE WITH FLIP-UP IMPLEMENT DRIVE COVER

(71) Applicant: EXMARK MANUFACTURING COMPANY, INCORPORATED, Beatrice, NE (US)

(72) Inventors: Christian S. C. Bryant, Lincoln, NE (US); Nickolas T. Moore, Beatrice, NE (US)

(73) Assignee: EXMARK MANUFACTURING COMPANY INCORPORATED, Beatrice, NE (US)

( * ) Notice: Subject to any disclaimer, the term of this patent is extended or adjusted under 35 U.S.C. 154(b) by 936 days.

(21) Appl. No.: 16/402,963

(22) Filed: May 3, 2019

(65) Prior Publication Data

US 2020/0346695 A1    Nov. 5, 2020

(51) Int. Cl.
| | |
|---|---|
| *B62D 25/10* | (2006.01) |
| *B62D 51/00* | (2006.01) |
| *B62D 51/04* | (2006.01) |
| *B62D 51/02* | (2006.01) |

(52) U.S. Cl.
CPC .......... *B62D 25/10* (2013.01); *B62D 51/001* (2013.01); *B62D 51/04* (2013.01); *B62D 51/02* (2013.01)

(58) Field of Classification Search
CPC .............................. B62D 25/10; B62D 51/02
See application file for complete search history.

(56) References Cited

U.S. PATENT DOCUMENTS

| | | | |
|---|---|---|---|
| 2,561,496 A | 7/1948 | Cicero | |
| 6,460,640 B1* | 10/2002 | Keagle | G05G 1/08 |
| | | | 74/491 |
| 7,980,569 B2* | 7/2011 | Azure | B62D 51/02 |
| | | | 172/329 |
| 9,528,309 B2 | 12/2016 | Fisher | |
| 10,986,782 B2* | 4/2021 | Fisher | A01D 34/66 |
| 2008/0202874 A1 | 8/2008 | Scheele et al. | |
| 2012/0049039 A1 | 3/2012 | Scheffler et al. | |
| 2021/0032847 A1* | 2/2021 | Carlson | B62D 55/18 |

OTHER PUBLICATIONS

NPL Document 1: Image of Toro Dingo TX1000W, The Toro Company, Bloomington, MN, USA. Believed available as early as Mar. 28, 2018. 1 Page.

\* cited by examiner

*Primary Examiner* — Kevin Hurley
(74) *Attorney, Agent, or Firm* — Mueting Raasch Group (57) ABSTRACT

A stand-up grounds maintenance vehicle including a chassis, a control tower, an implement, and a cover. The chassis is supported upon a ground surface by a plurality of ground-engaging members and extends along a longitudinal axis between a front end and a rear end. The control tower is coupled to the chassis proximate the rear end. The implement is attached to the chassis and is positioned at least partially forward of the control tower. The implement includes an implement drive. The cover extends over the implement drive and is pivotally coupled to the chassis.

22 Claims, 11 Drawing Sheets

GROUNDS MAINTENANCE VEHICLE WITH FLIP-UP IMPLEMENT DRIVE COVER

Embodiments of the present disclosure are directed to grounds maintenance vehicles such as stand-on and walk-behind lawn mowers and, more particularly, to such vehicles incorporating a flip-up implement drive cover.

BACKGROUND

Riding and walk-behind grounds maintenance vehicles such as lawn mowers and the like are used by homeowners and professionals alike to care for lawns and other surfaces. These vehicles typically include a prime mover, e.g., internal combustion engine or electric motor, to power not only an implement (e.g., cutting deck) attached to the vehicle, but also a traction drive system, the latter adapted to propel the vehicle over a ground surface.

Landscape contractors sometimes prefer stand-on vehicles (e.g., mowers), which include an operator platform that is attached to the vehicle. For example, such mowers allow turf to be mowed in an efficient, relatively quick manner as compared to some conventional riding mowers. One benefit of stand-on and walk-behind maintenance vehicles is that they are often shorter than conventional maintenance vehicles and, consequently, may be more maneuverable under certain conditions. Typically, stand-on and walk-behind vehicles utilize an engine having a horizontally or vertically-oriented drive shaft to provide power, e.g., via endless belts, to both the implement (e.g., the cutting deck) and to the traction drive system. Each drive wheel may utilize its own hydrostatic pump, and each pump may be independently controlled to provide the vehicle with a very small turning radius and, in some instances, a zero-turning-radius (ZTR) wherein the vehicle can spin about a midpoint between the two drive wheels.

Stand-on and walk-behind maintenance vehicles often include a cover positioned over the implement that may be coupled thereto using one or more of various different types of fasteners. As such, the cover may not be easily removable or movable to a position that permits access to the components thereunder. In other words, tools may be required to remove or move the cover. Further, on some vehicles, the prime mover (e.g., engine) may be completely located underneath the cover. As such, the cover may be used to protect the prime mover from undesired contact.

SUMMARY

Embodiments described herein may provide a stand-up grounds maintenance vehicle including a chassis, a control tower, an implement, and a cover. The chassis may be supported upon a ground surface by a plurality of ground-engaging members and may extend along a longitudinal axis between a front end and a rear end. The control tower may be coupled to the chassis proximate the rear end. The implement may be attached to the chassis and may be positioned at least partially forward of the control tower. The implement may include an implement drive. The cover may extend over the implement drive and may be pivotally coupled to the chassis.

Other embodiments described herein may provide a stand-up grounds maintenance vehicle including a chassis, a control tower, an implement, one or more engine components, and a cover. The chassis may be supported upon a ground surface by a plurality of ground-engaging members and may extend along a longitudinal axis between a front end and a rear end. The control tower may be coupled to the chassis proximate the rear end. The implement may be attached to the chassis and may be positioned at least partially forward of the control tower. One or more drive train components may include a prime mover, an exhaust system, and an electric storage device. The implement may include an implement drive operably coupled to the prime mover. The cover may be pivotally coupled to the chassis proximate the front end of the chassis. The implement drive and at least one of the one or more drive train components may be located under the cover when the cover is in a closed position.

Yet other embodiments described herein may provide a stand-on or walk-behind lawn mower including a chassis, a control tower, a prime mover, a deck, and a cover. The chassis may be supported upon a ground surface by a plurality of ground-engaging members and may extend along a longitudinal axis between a front end and a rear end. The control tower may be coupled to the chassis proximate the rear end. The prime mover may be coupled to the chassis. The deck may be attached to the chassis and may be positioned at least partially forward of the control tower. The deck may include a deck drive operably coupled to the prime mover. The cover may extend over the deck drive and may be pivotally coupled to the chassis proximate the front end of the chassis. At least a portion of the prime mover may be above an elevation of an uppermost surface of the cover, when in a closed position.

The above summary is not intended to describe each embodiment or every implementation. Rather, a more complete understanding of various illustrative embodiments will become apparent and appreciated by reference to the following Detailed Description of Exemplary Embodiments in view of the accompanying figures of the drawing.

BRIEF DESCRIPTION OF THE VIEWS OF THE DRAWING

Exemplary embodiments will be further described with reference to the figures of the drawing, wherein.

The figures are rendered primarily for clarity and, as a result, are not necessarily drawn to scale. Moreover, various structure/components, including but not limited to fasteners, electrical components (wiring, cables, etc.), and the like, may be shown diagrammatically or removed from some or all of the views to better illustrate aspects of the depicted embodiments, or where inclusion of such structure/components is not necessary to an understanding of the various exemplary embodiments described. The lack of illustration/description of such structure/components in a particular figure is, however, not to be interpreted as limiting the various embodiments in any way.

DETAILED DESCRIPTION OF ILLUSTRATIVE EMBODIMENTS

In the following detailed description of illustrative embodiments, reference is made to the accompanying figures of the drawing which form a part hereof. It is to be understood that other embodiments, which may not be described and/or illustrated herein, are certainly contemplated.

All headings provided herein are for the convenience of the reader and should not be used to limit the meaning of any text that follows the heading, unless so specified. Moreover, unless otherwise indicated, all numbers expressing quantities, and all terms expressing direction/orientation (e.g., vertical, horizontal, parallel, perpendicular, etc.) in the specification and claims are to be understood as being modified by the term "about." The term "and/or" (if used) means one or all of the listed elements or a combination of any two or more of the listed elements. "I.e." is used as an abbreviation for the Latin phrase id est, and means "that is." "E.g.," is used as an abbreviation for the Latin phrase exempli gratia, and means "for example."

Embodiments of the present disclosure are directed to powered (e.g., self-propelled) grounds maintenance vehicles incorporating a flip-up implement drive cover extending over an implement (e.g., a cutting deck) and pivotally coupled to a chassis of the vehicle. The embodiments of the present disclosure may include a stand-up grounds maintenance vehicle including, e.g., stand-on/walk-behind grounds maintenance vehicle. The flip-up implement drive cover may be pivotally coupled to the chassis proximate a front end of the chassis. As such, the cover may pivot relative to the chassis between a closed position (e.g., when a portion of the cover is adjacent or in contact with the chassis) and an open position (e.g., when the portion of the cover is spaced a distance from the chassis). Further, any components (e.g., implement drive system components or one or more of the following: engine, electric storage device, exhaust system, etc.) located below the cover may be accessible when the cover is in the open position (e.g., as compared to when the cover is in the closed position).

With reference to the figures of the drawing, wherein like reference numerals designate like parts and assemblies throughout the several views, FIGS. 1A-1D illustrate an implement drive cover (e.g., deck cover) in accordance with one embodiment of the present disclosure as it may be incorporated on a self-propelled vehicle, e.g., a stand-on/walk-behind lawn mower 100. While, for the sake of brevity, embodiments of the disclosure are herein described with reference to a stand-on/walk-behind mower (hereinafter generically referred to simply as a "mower"), those of skill in the art will realize that the concepts described herein are equally applicable to other types of walk-behind and ride-behind mowers, as well as to almost any other walk-behind, or ride-behind, grounds maintenance vehicle. Such vehicles may include, for example, skid-steer loaders, aerators, material spreaders and sprayers, snow throwers, tillers, etc.

Figure 1A:
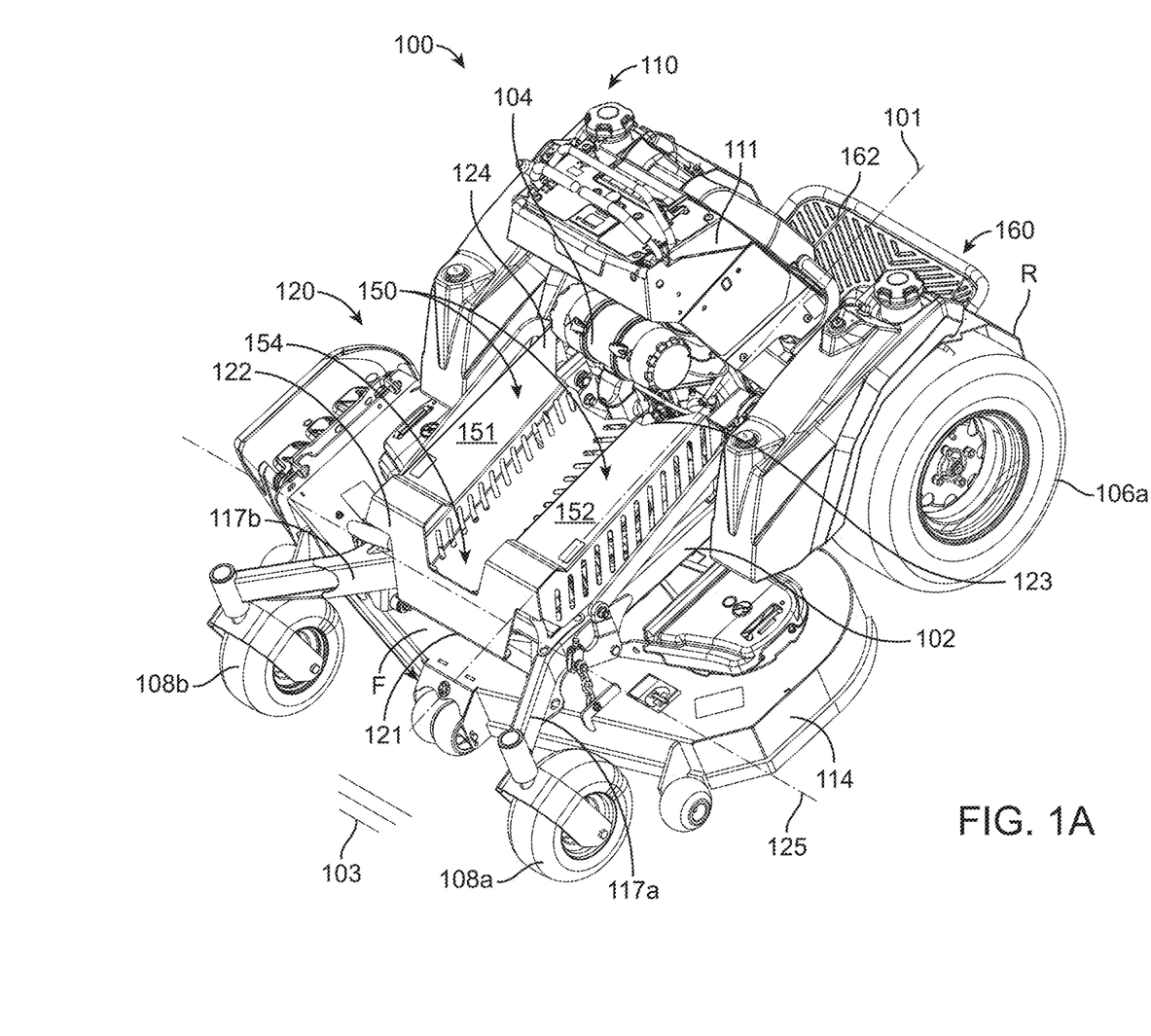
FIG. 1A is a left front perspective view of a grounds maintenance vehicle, e.g., a stand-on mower in accordance with embodiments of the present disclosure, with a cover extending over a cutting deck and in a closed position.

It is noted that the terms "including," "having," "comprises" and variations thereof do not have a limiting meaning where these terms appear in the accompanying description and claims. Further, "a," "an," "the," "at least one," and "one or more" are used interchangeably herein. Moreover, relative terms such as "left," "right," "front," "fore," "forward," "rear," "aft," "rearward," "top," "bottom," "side," "upper," "lower," "above," "below," "horizontal," "vertical," and the like may be used herein and, if so, are from the perspective of one operating the mower 100 while the mower 100 is in an operating configuration, e.g., while the mower 100 is positioned such that ground-engaging members (e.g., wheels 106 and 108) rest upon a generally horizontal ground surface 103 as shown in FIG. 1A. These terms are used only to simplify the description, however, and not to limit the interpretation of any embodiment described.

Still further, the suffixes "a" and "b" may be used throughout this description to denote various left- and right-side parts/features, respectively. However, in most pertinent respects, the parts/features denoted with "a" and "b" suffixes are substantially identical to, or mirror images of, one another. It is understood that, unless otherwise noted, the description of an individual part/feature (e.g., part/feature identified with an "a" suffix) also applies to the opposing part/feature (e.g., part/feature identified with a "b" suffix). Similarly, the description of a part/feature identified with no suffix may apply, unless noted otherwise, to both the corresponding left and right part/feature.

Figure 1B:
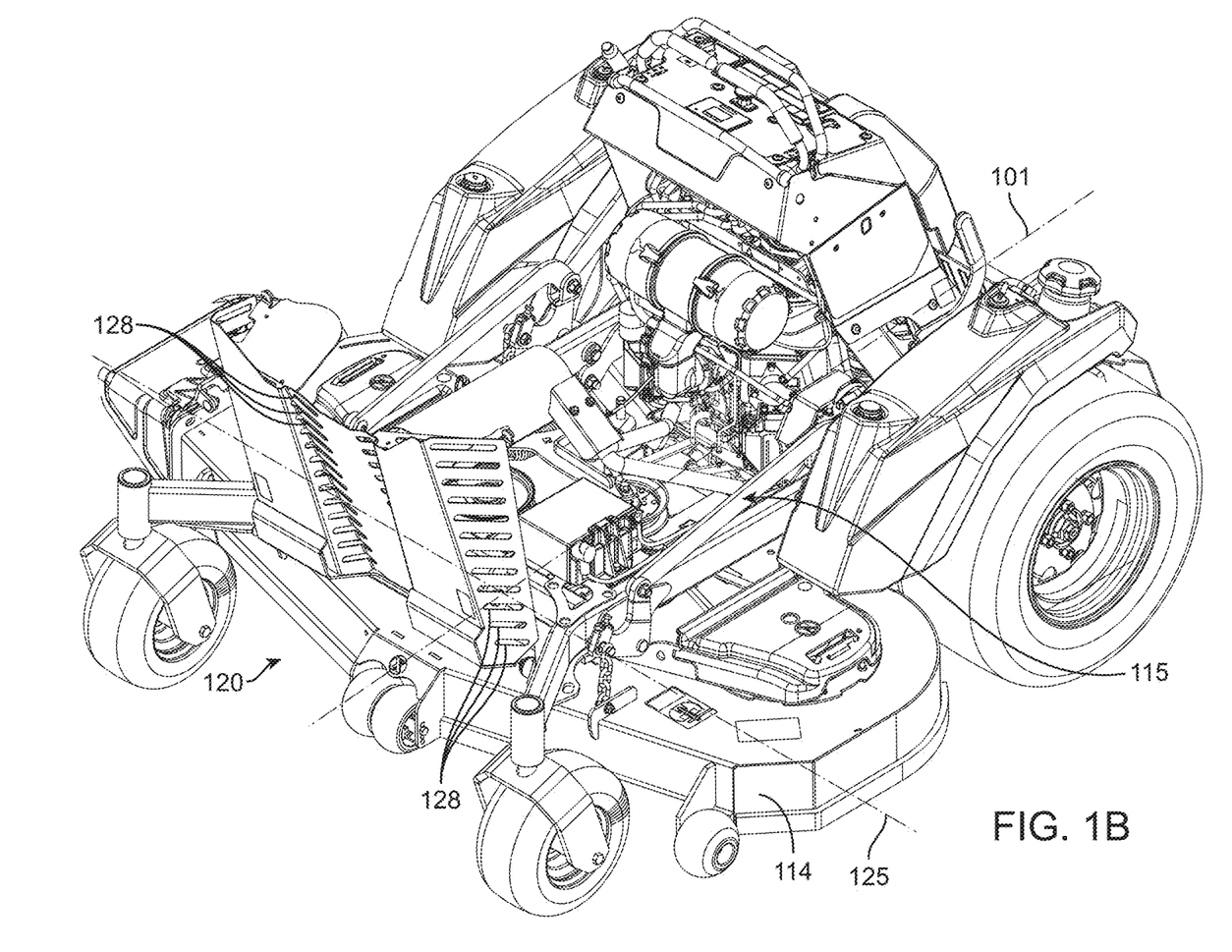
FIG. 1B is a left front perspective view of the vehicle of FIG. 1A with the cover in an open position.
Figure 1C:
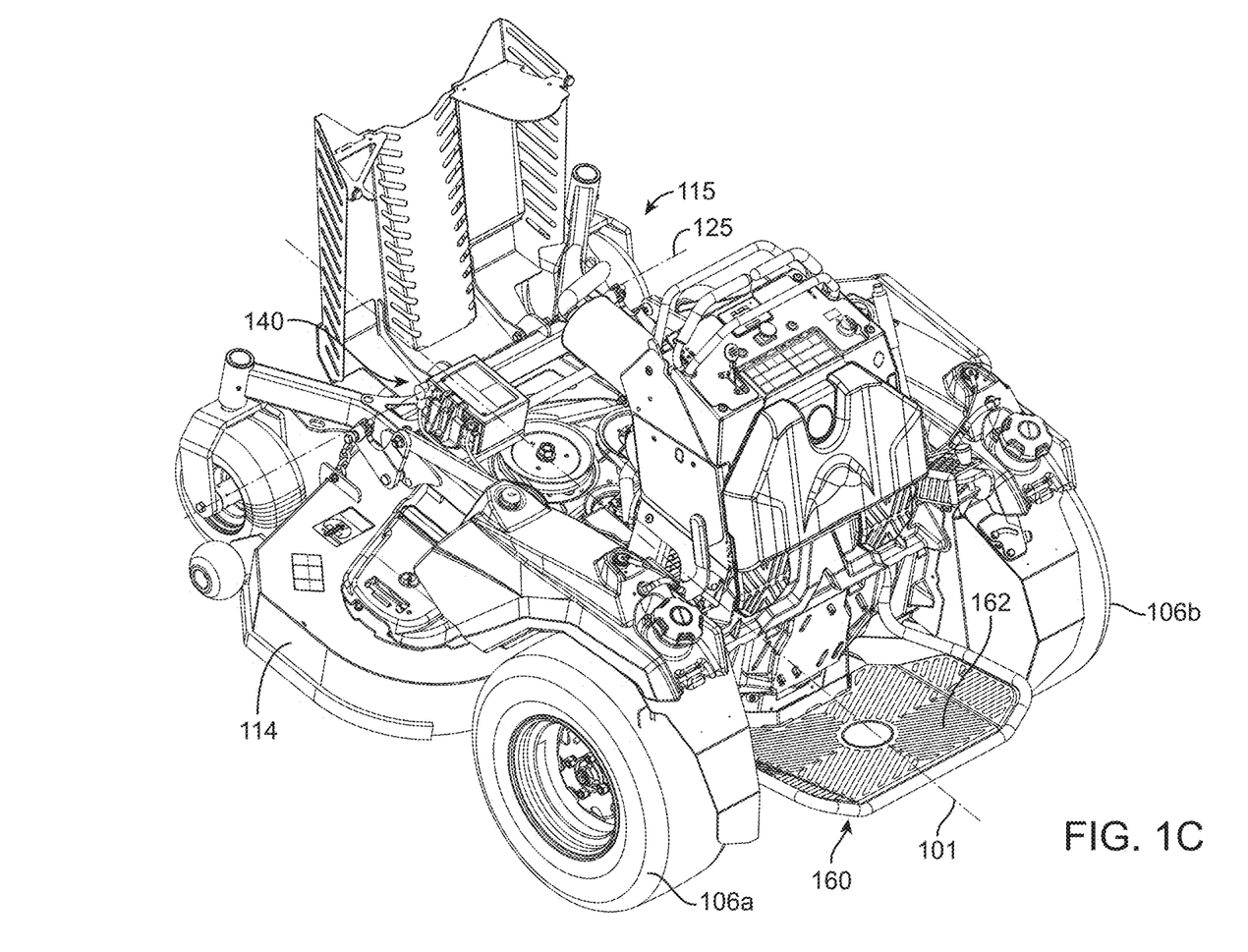
FIG. 1C is a left rear perspective view of the vehicle of FIG. 1B.

While not necessarily central to an understanding of exemplary embodiments of the present disclosure (e.g., other mower and other vehicle configurations are certainly contemplated), the general construction of the illustrative mower 100 is briefly described below. FIG. 1A illustrates the mower 100 including a frame or chassis 102 having a front end F and a rear end R (and a longitudinal axis 101 extending between the front and rear ends), the chassis 102 supporting a power source or prime mover, e.g., internal combustion engine 104. A pair of transversely opposing, ground-members, e.g., first and second (left and right) rear drive wheels 106a and 106b (right rear drive wheel 106b is shown in FIG. 1C), may be coupled to opposite (left and right) rear sides of the chassis to support the mower upon, and propel the mower 100 relative to, the ground surface 103. Each drive wheel 106 may be powered by its own hydraulic motor that receives power from, at least in one embodiment, its own hydrostatic pump. Other drive systems, e.g., gear or pulley driven systems, may also be utilized by the mower 100.

Operator controls, as further described below, permit independent control of the speed and direction of each drive wheel 106, allowing operator control of mower 100 speed and direction from a walking or riding (e.g., standing) position generally behind the mower 100. A pair of front ground-engaging members (e.g., left and right caster wheels 108a, 108b), which may be connected to forwardly extending frame rails 117 (of the chassis 102), may support the front of the mower 100 in rolling engagement with the ground surface 103.

Although the illustrated mower 100 has the drive wheels 106 in the rear and caster wheels 108 in front, this configuration is not limiting. For example, other embodiments may reverse the location of the wheels, e.g., drive wheels in front and driven or undriven wheels in back. Moreover, other configurations may use different wheel configurations altogether, e.g., a tri-wheel configuration or a vehicle having conventionally-steered wheels. These and other embodiments are certainly possible without departing from the scope of the present disclosure. Moreover, while illustrated herein as wheels, other ground-engaging members (e.g., tracks, skids, etc.) are also contemplated.

The mower 100 may further include an operator control system 110. In the illustrated embodiment, the control system 110 may include operator controls that are mounted to upwardly extending portions of the chassis referred to herein as a control tower 111. The control tower 111 may be located at or near the rear end R of the mower 100. Situated near the top of the control tower is a control area that positions mower controls within comfortable reach of an operator who may be standing either behind the mower or upon a platform 162. The control system 110 may include control levers configured to move the mower 100 forward and rearward. The control system 110 may also include a parking brake handle (not visible) to selectively activate a brake when the vehicle is parked. A deck height adjustment lever may also be provided to adjust the cutting height of a cutting deck 114. Other controls may include a throttle lever to control the speed of the engine 104, and an implement clutch control to initiate and terminate power delivery to the cutting blades of the mower deck 114.

Further, the illustrative mower 100 may include an operator support 160 configured to support an operator standing behind the mower 100 such that the operator is positioned relative to the control system 110 and moves along with the mower 100. The operator support 160 may include a standing platform 162 attached to the chassis 102 at or near the rear end R. The standing platform 162 may be configured to support the standing operator. Specifically, the operator support 160 (e.g., including the standing platform 162) may be located aft of the control tower 111.

An implement, e.g., cutting deck 114, may be connected to a lower side of the chassis 102 (generally longitudinally between the drive wheels 106 and the caster wheels 108). The cutting deck 114 may include one or more cutting blades (not shown) as known in the art. The cutting blades may be operatively powered, via spindles connected to the deck, by the engine 104 via, e.g., an implement drive system or deck drive system. During operation, power may be selectively delivered to the cutting deck 114, whereby the blades rotate at a speed sufficient to sever grass and other vegetation as the cutting deck passes over the ground surface 103. As indicated above, other grounds maintenance vehicles may locate the implement at other locations, e.g., along the side of the chassis or forward of the chassis (e.g., a forwardly-mounted or "out-front" deck configuration). For example, as shown in FIG. 1A, the cutting deck 114 is positioned forward (e.g., along the longitudinal axis 101) of the control tower 111. Moreover, while described as a cutting deck, the implement may be any tool (e.g., aerator, etc.) that attaches to the chassis 102.

The mower 100 may further include a cover 120 extending over the deck 114 and pivotally coupled to the chassis 102. The cover 120 may extend between a front-end region 122 and a rear-end region 124. The cover 120 may be pivotally coupled to the chassis 102 at any suitable location. For example, the cover 120 may be pivotally coupled to the chassis 102 proximate the front end F of the chassis 102. Pivoting proximate the front end F of the chassis 102 may provide the most access to components positioned thereunder. Furthermore, any suitable portion of the cover 120 may be pivotally coupled to the chassis 102. For example, while shown as having the front-end region 122 of the cover 120 pivotally coupled to the chassis 102, the cover 120 may provide its pivot at another location, e.g., near the rear-end region 124 of the cover 120. Nonetheless, in the illustrated embodiments, the cover 120 may be pivotally coupled to the chassis 102 at a front edge 121 of the cover 120. In other embodiments, the cover 120 may be pivotally coupled to the chassis 102 at a rear edge 123 of the cover 120 or one of the sides of the cover 120.

Figure 1D:
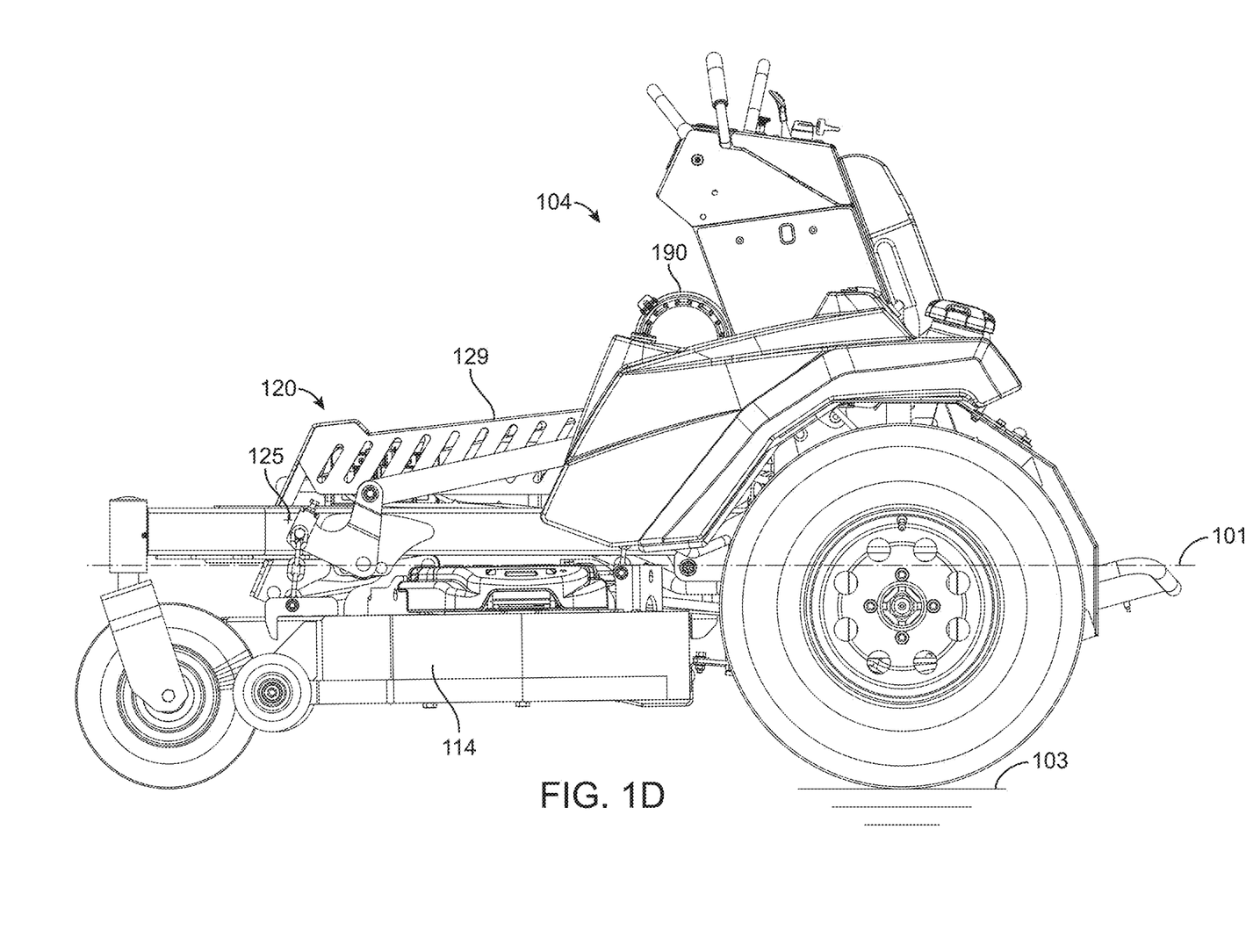
FIG. 1D is a left side view of the vehicle of FIG. 1A.

The cover 120 may be configurable between a closed position and an open position. When in the closed position, the cover 120 may be configured to isolate the components positioned therein from the area surrounding the outside of the cover 120. For example, the cover 120 (e.g., when in the closed position) may prevent immediate access (e.g., both into and out of) to the components covered by the cover 120. FIGS. 1A and 1D illustrate the cover 120 configured in a closed position, and FIGS. 1B and 1C illustrate the cover 120 configured in an open position. When the cover 120 is in the open position (e.g., as shown in FIGS. 1B and 1C), a portion 115 of the deck 114 and other components of the mower 100 may be exposed or accessible. When the cover 120 is in the closed position (e.g., as shown in FIG. 1A), the portion 115 of the deck 114 and other components of the mower 100 may be at least partially covered or inaccessible.

Specifically, the mower 100 may include one or more drive train components 140 located between the deck 114 and the cover 120 when the cover 120 is in the closed position. The one or more drive train components 140 may include an exhaust system, implement drive, an engine, an electric storage device (e.g., a battery), etc. The exhaust system may be configured to channel and/or dissipate waste heat from the prime mover. Specifically, the exhaust system may include a typical internal combustion engine exhaust system, as is known in the art, or may include a fan exhaust system. In one or more embodiments, the electric storage device may be used in conjunction with the prime mover (e.g., an electric motor). The cover 120 may be positioned such that the one or more drive train components 140 are protected or shielded when the cover 120 is in the closed position and exposed or accessible when the cover 120 is in the open position.

Figure 3A:
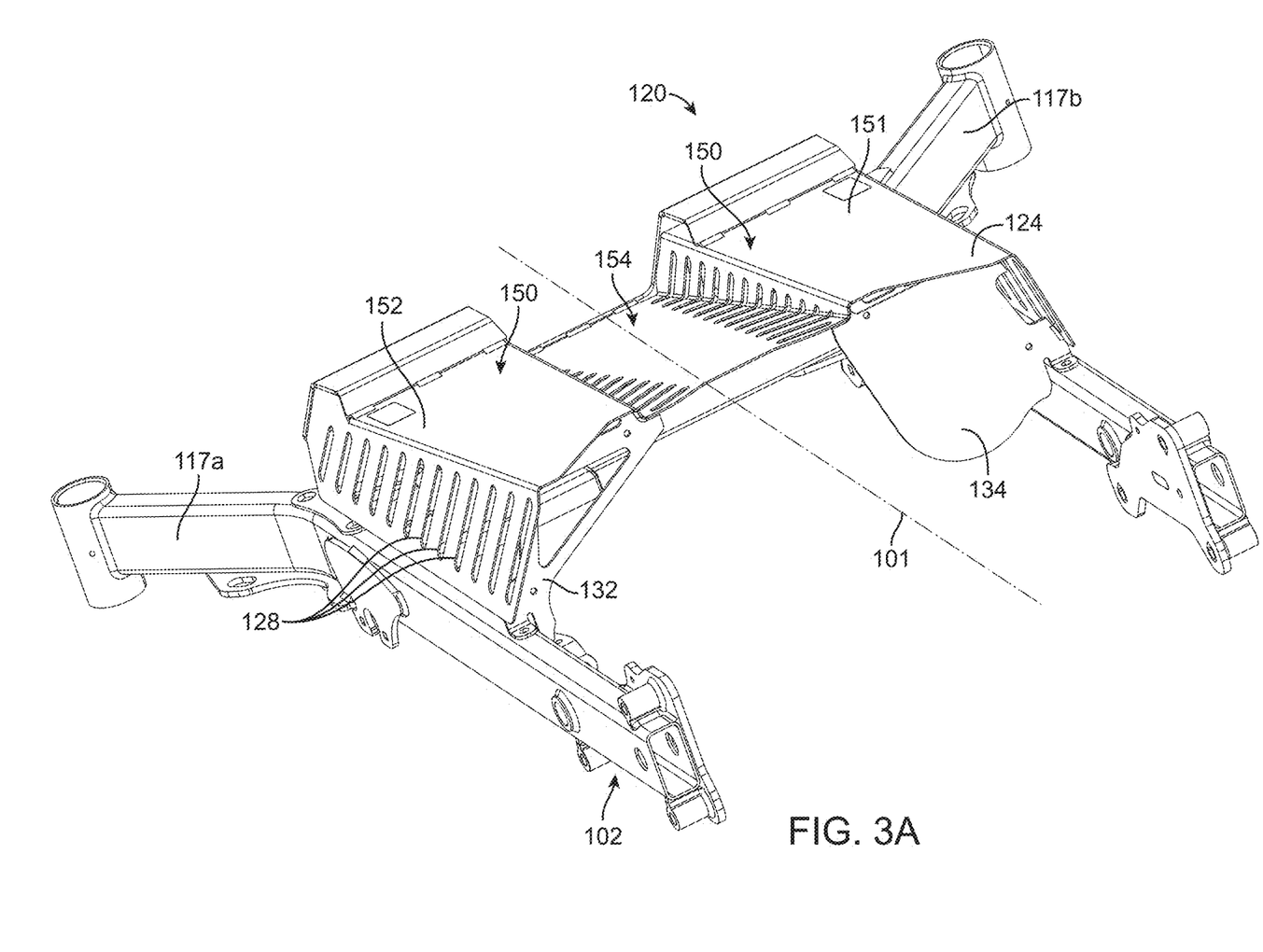
FIG. 3A is a left rear perspective view of an isolated cover and associated vehicle structure, the cover shown in a closed position relative to a chassis in accordance with embodiments of the present disclosure.
Figure 3B:
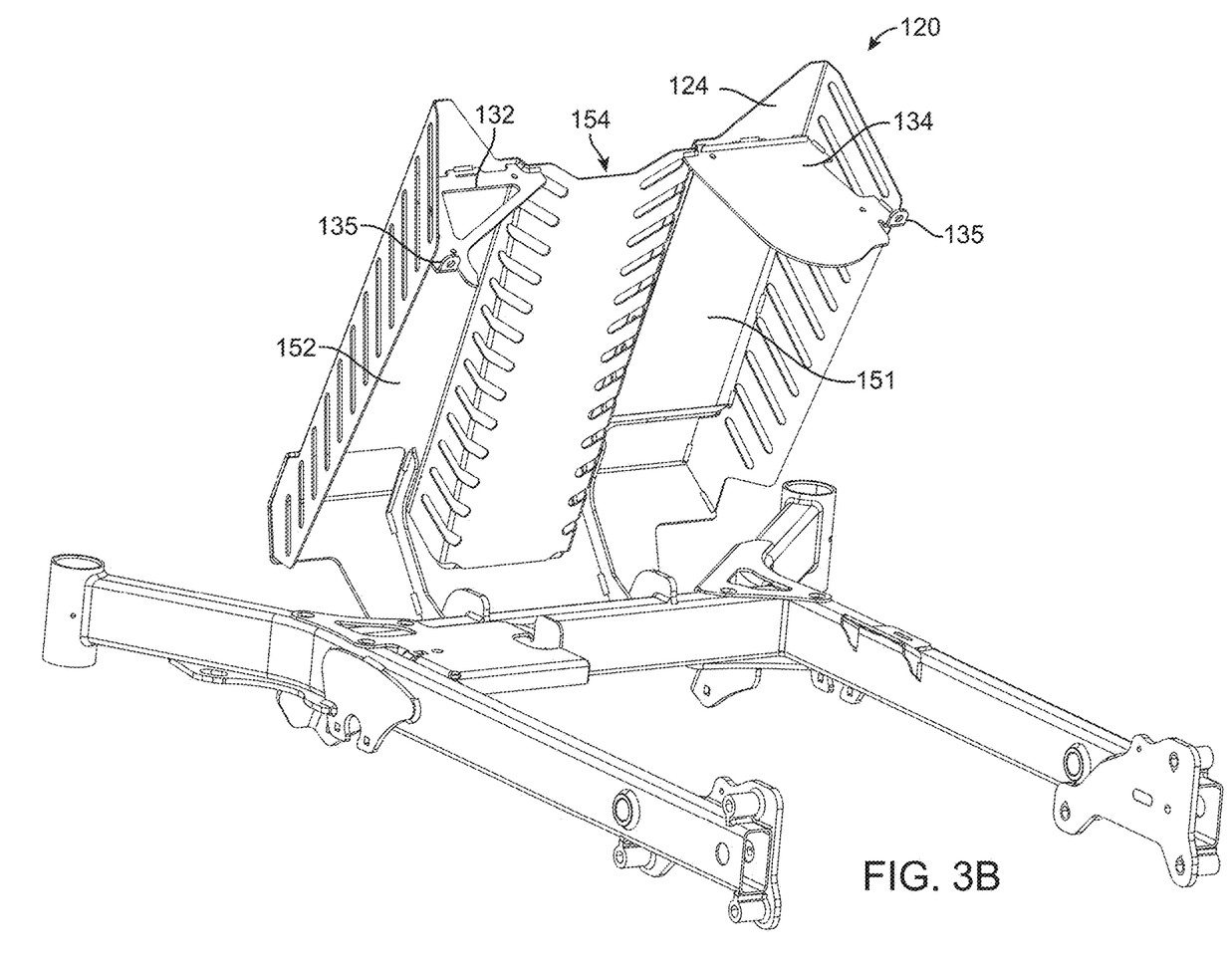
FIG. 3B is a bottom left rear perspective view of the isolated cover of FIG. 3A, but shown in an open position relative to the chassis.

In one or more embodiments, the cover 120 may define one or more recesses 150 (e.g., see FIG. 1A-1C) configured to receive the one or more drive train components 140 when the cover 120 is in the closed position. In other words, the cover 120 may be shaped such the one or more drive train components 140 may be accommodated or conformed to when the cover 120 is in the closed position (e.g., such that the component may be "nested" within the cover 120 when in the closed position). Specifically, as shown in FIGS. 1A, 3A, and 3B, the one or more recesses 150 may include a first recess 151 extending along the longitudinal axis 101 and a second recess 152 (e.g., different than and spaced apart from the first recess 151) extending along the longitudinal axis 101. While FIG. 1A illustrates only two recesses, the cover 120 may include any number of recesses (e.g., of any size and extending in any direction) to accommodate any number of components located between the cover 120 and the deck 114.

Additionally, as shown in FIGS. 1A, 3A, and 3B, the cover 120 may define a channel 154 extending along the longitudinal axis 101 between the first and second recesses 151, 152. Similar to the recesses 151, 152, the channel 154 may be shaped in accordance with any components positioned adjacent the channel 154 when the cover 120 is in the closed position to, e.g., accommodate or conform thereto. For example, in one or more embodiments, the first recess 151 may be shaped to accommodate the exhaust system (e.g., the muffler) and the second recess 152 may be shaped to accommodate the electric storage device (e.g., the battery), or vice versa.

Figure 2A:
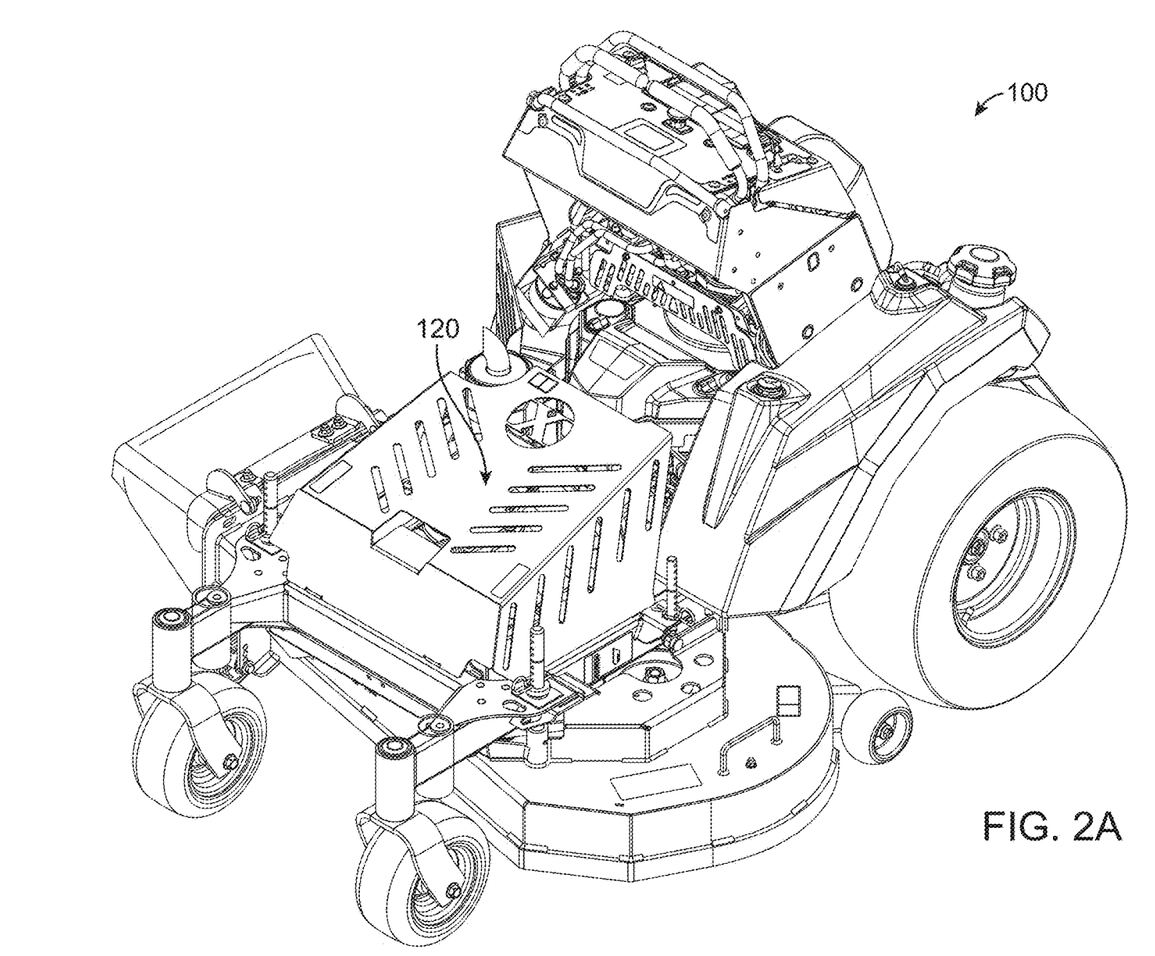
FIG. 2A is a left front perspective view of another embodiment of a grounds maintenance vehicle, e.g., a stand-on mower in accordance with embodiments of the present disclosure, with a cover extending over a cutting deck and in a closed position.
Figure 2B:
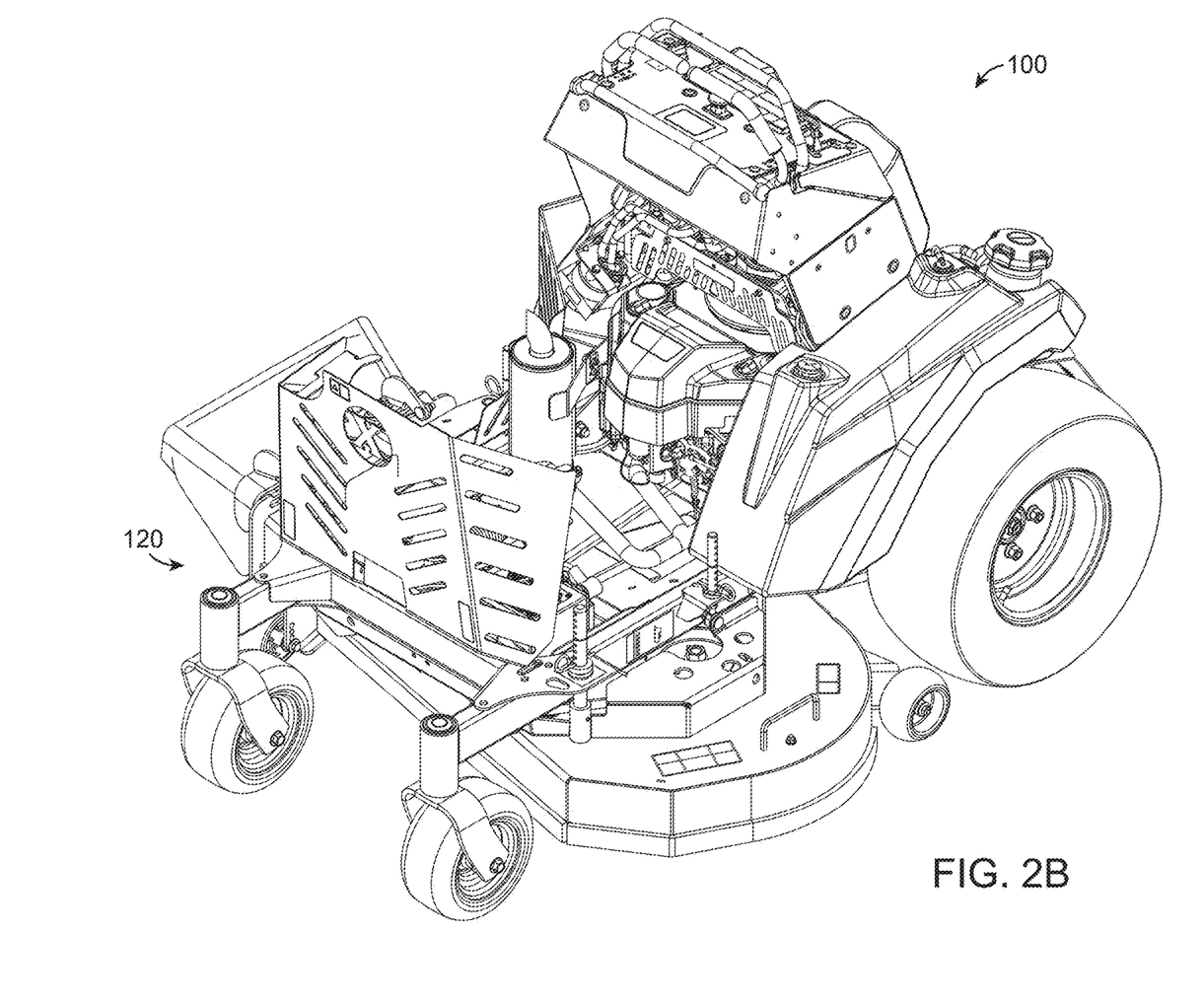
FIG. 2B is a left front perspective view of the vehicle of FIG. 2A with the cover in an open position.
Figure 2C:
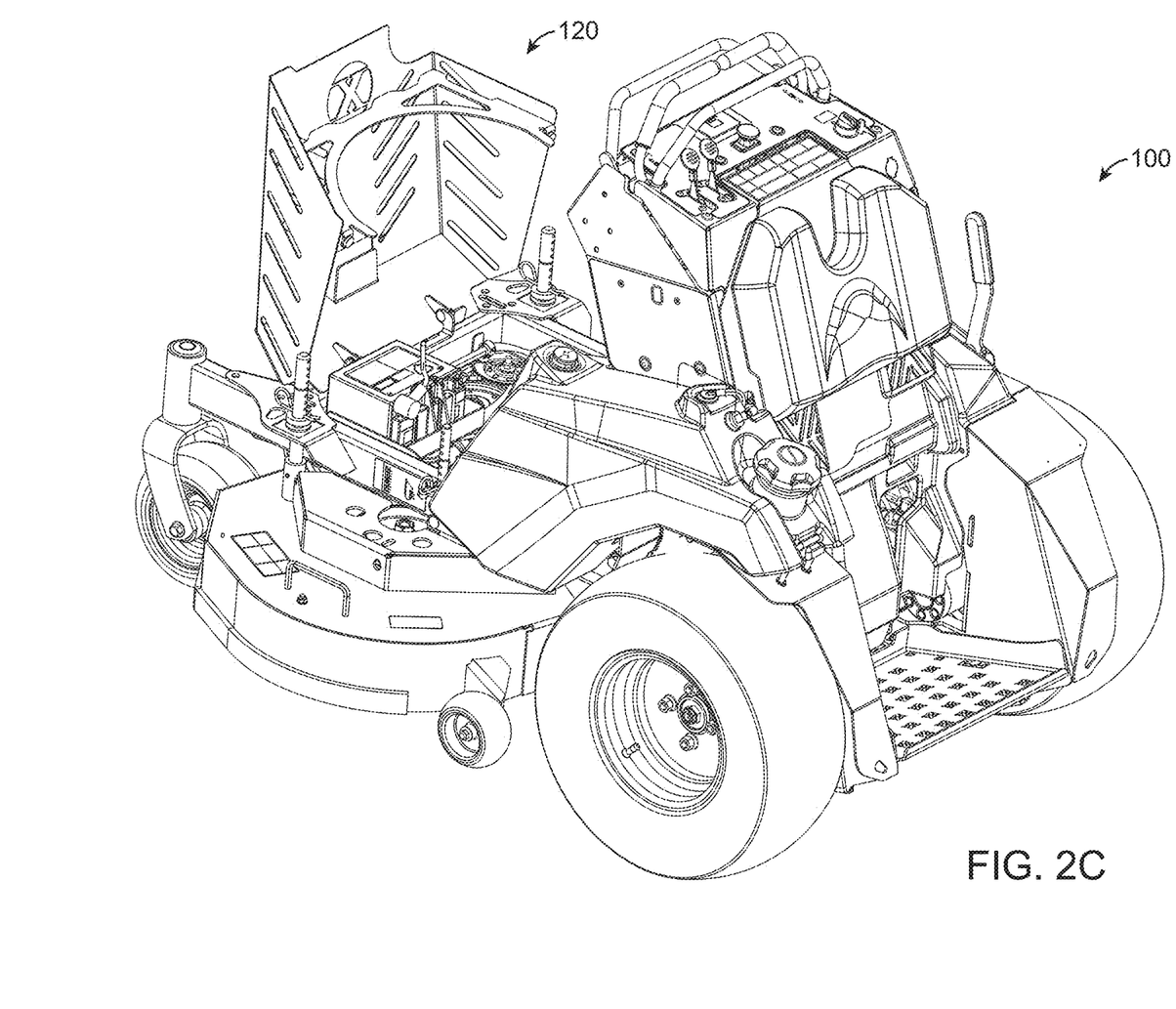
FIG. 2C is a left rear perspective view of the vehicle of FIG. 2B.

FIGS. 2A-2B illustrate an implement drive cover 120 of a mower 100 in accordance with another embodiment of the present disclosure. For example, an upper surface of the cover 120 may define a generally planar or flat surface (e.g., without the recesses and channels as described in connection with FIG. 1A). FIG. 2A illustrates the cover 120 in a closed position and FIG. 2B illustrates the cover 120 in an open position. The cover 120 illustrated in FIGS. 2A-2B may include any feature as described with the embodiment illustrated in FIG. 1A.

The cover 120 may be configured to pivot relative to the chassis 102 about a pivot axis 125, as shown in FIG. 1A. Further, as shown in FIG. 1D, the pivot axis 125 may be located above the deck 114 (e.g., an uppermost point of the deck 114 may be positioned at an elevation relative to the ground surface 103 that is below the pivot axis 125). The cover 120 may pivot between the open and closed positions about the pivot axis 125. In one or more embodiments, the cover 120 may extend about perpendicular (e.g., 90 degrees) relative to the longitudinal axis 101 when the cover 120 is in the open position. In one or more embodiments, the cover 120 may extend about 45 degrees or less, 30 degrees or less, 15 degrees or less, 10 degrees or less, 5 degrees or less (e.g., in either the forward or backward direction) from perpendicular to the longitudinal axis 101 when the cover 120 is in the open position.

Figure 3C:
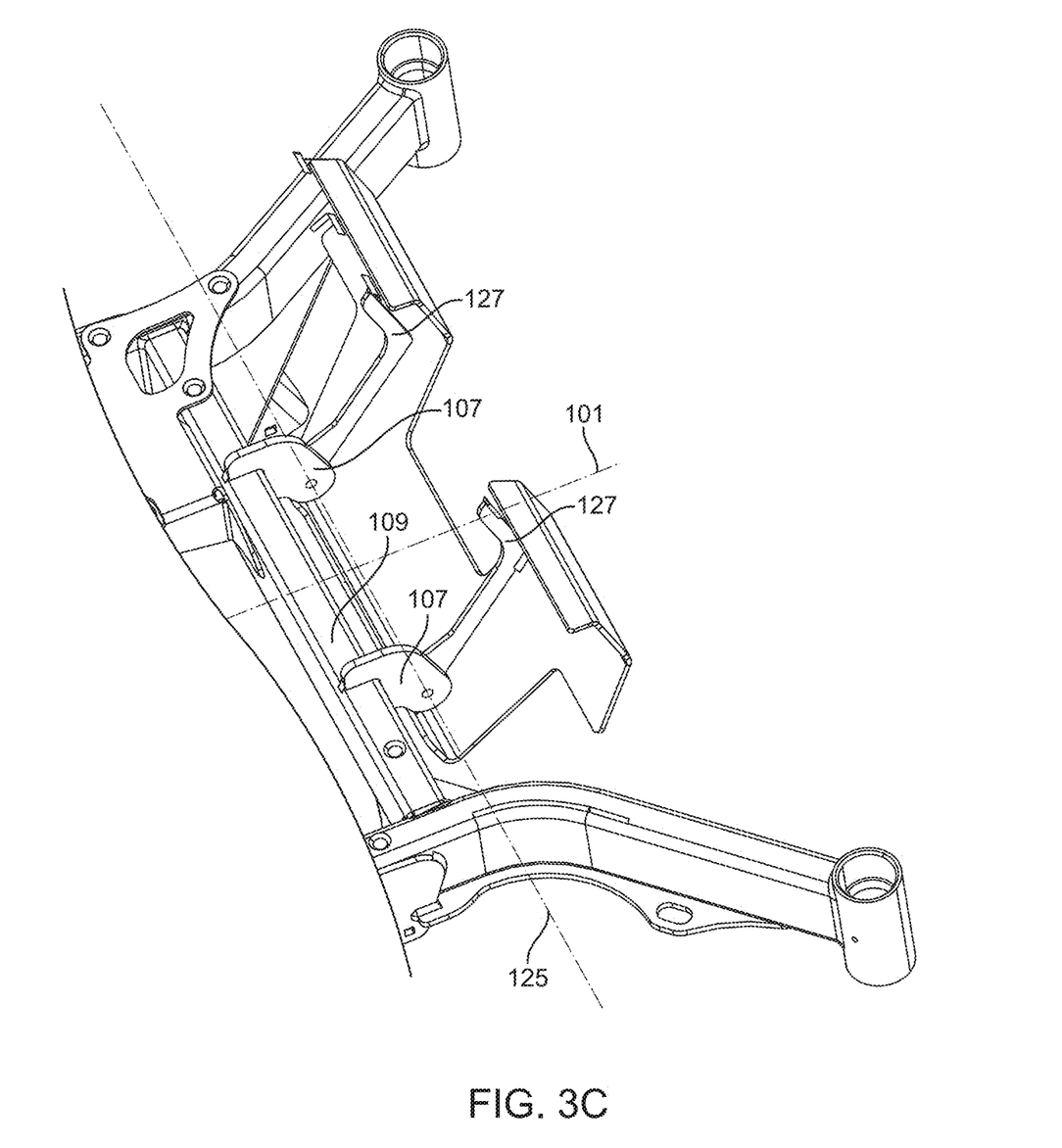
FIG. 3C is a partial enlarged perspective view of an interface connection between the cover and the chassis of FIG. 3B.

In one or more embodiments, the cover 120 may interact or contact the chassis 102 such that the cover 120 is prevented from pivoting past a certain point when moving from the closed position to the open position. For example, the contact or interaction between the cover 120 and the chassis 102 may prevent the cover 120 from pivoting more than 135 degrees, more than 120 degrees, more than 105 degrees, etc. when the cover 120 moves from the closed position to the open position. In other words, the cover 120 and the longitudinal axis 101 may form an angle of greater than or equal to 45 degrees, greater than or equal to 60 degrees, greater than or equal to 75 degrees, etc. In one or more embodiments, one or both of the cover 120 and the chassis 102 may include a stop structure at the point of interaction between the cover 120 and the chassis 102 when the cover 120 is in the open position. For example, the cover 120 may be configured to contact a front surface of the cross rail 109 (e.g., as shown in FIG. 3C) to maintain the cover 120 in the open position (e.g., such that the cover 120 rests on the cross rail 109).

In one or more embodiments, the cover 120 may be configured to toollessly remain in the closed position and toollessly remain in the open position. In other words, the cover 120 may maintain a position in either of the closed position or the open position without the assistance of any other component (e.g., without the use of tools). For example, in some embodiments, the weight distribution of the cover 120 may be configured to move through a vertical plane (e.g., oriented transverse to the longitudinal axis 101) located at the pivot axis 125 when the cover 120 moves from the closed position to the open position such that the cover 120 may remain in the open position. In other words, a center of the weight distribution of the cover 120 may be positioned forward of the vertical plane (e.g., when the cover 120 pivots proximate the front-end region 122 of the cover 120), when in the open position. As such, when the center of weight distribution of the cover 120 moves through the vertical plane (e.g., from a position forward therefrom) towards the closed position, the weight of the cover 120 forces the cover 120 towards the closed position. In other embodiments, a latch (e.g., requiring an additional operation by the operator) may also be used to retain the cover 120 in the closed position or the open position. Also, for example, a gas assist spring or other type of spring assist may be used to help open or retain the cover 120 in the closed position or the open position.

Furthermore, the cover 120 may pivot relative to the chassis 102 in any suitable way. For example, as shown in FIG. 3C, the cover 120 may include one or more cover pivot brackets 127 and the chassis 102 may include one or more chassis pivot brackets 107. The one or more cover pivot brackets 127 may be pivotally coupled to the one or more chassis pivot brackets 107 (e.g., through apertures, pins, bolts, screws, etc.) such that the cover 120 pivots relative to the chassis 102 about the pivot axis 125. In one or more embodiments, the interaction between the one or more pivot brackets 127 and the one or more chassis pivot brackets 107 may include friction elements to add resistance to the pivoting of the cover 120. Therefore, the cover 120 may need a higher initial force applied thereto to begin the pivoting motion of the cover 120 (e.g., from open to closed or from closed to open) to, e.g., help keep the cover in either the open position or closed position. The one or more cover pivot brackets 127 may include any suitable number of cover brackets and the one or more chassis pivot brackets 107 may include any suitable number of chassis pivot brackets. As shown in FIG. 3C, the mower 100 includes two cover pivot brackets 127 and two corresponding chassis pivot brackets 107. In one or more embodiments, the one or more cover pivot brackets 127 may be fixedly coupled to the cover 120. Similarly, in one or more embodiments, the one or more chassis pivot brackets 107 may be fixedly (e.g., welded, bonded, fastened, adhered, etc.) coupled to the chassis 102 (e.g., to a cross rails 109 as shown in FIG. 3C). In other embodiments, the one or more cover pivot brackets 127 may be integral with the cover 120. Similarly, in other embodiments, the one or more chassis pivot brackets 107 may be integral with the chassis 102.

As shown in FIG. 3A, the cover 120 may be configured to directly contact the chassis 102 (e.g., the frame rails 117) when the cover 120 is in the closed position. Specifically, the cover 120 may include a first bracket 132 configured to contact the first frame rail 117a and a second bracket 134 configured to contact the second frame rail 117b, when in the closed position. The first and second brackets 132, 134 may be located proximate the rear-end region 124 of the cover 120 and may be positioned between the cover 120 and the deck 114 when in the closed position (e.g., the underside of the cover 120). The first and second brackets 132, 134 may also assist in aligning the cover 120 within frame rails 117a, 117b to limit lateral movement (e.g., side-to-side movement) when the cover 120 is in the closed position (e.g., by extending along multiple surfaces of the frame rail 117).

Further, as shown in FIG. 3B, each of the first and second brackets 132, 134 may include a tab 135 that is oriented to correspond with the corresponding frame rail 117 to form a "flush" point of contact. In one or more embodiments, one or both of the cover 120 and the chassis 102 may include isolator elements (e.g., elastomeric elements) configured to interface between the cover 120 and the chassis 102 when the cover is in the closed position. For example, the isolator elements may be located on one or more of the tabs 135 of the cover 120 (e.g., coupled through apertures in the one or more tabs 135) or positioned on the chassis 102 such that one or more of the tabs 135 are aligned with the isolator elements when the cover 120 is in the closed position.

Figure 4:
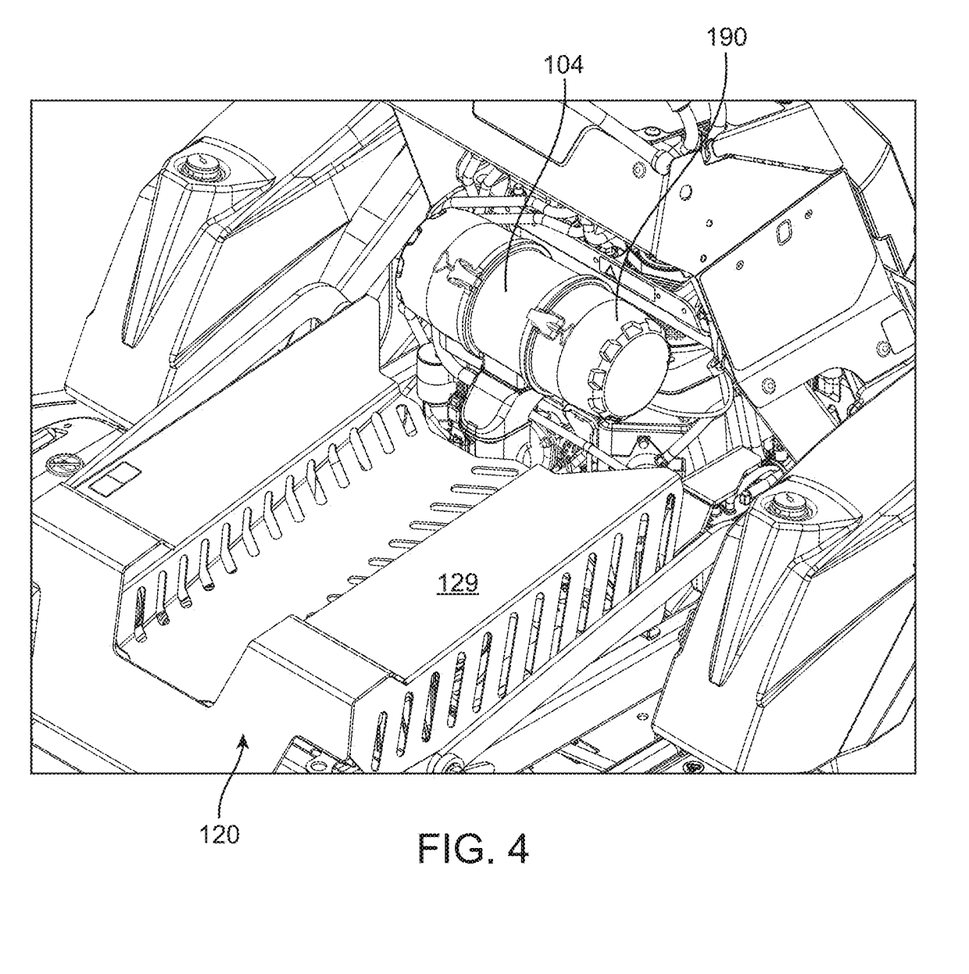
FIG. 4 is an enlarged perspective view of the cover and a prime mover of the vehicle of FIG. 1A.

Additionally, in one or more embodiments, at least a portion of the prime mover 104 may be located within the control tower 111. For example, as shown in FIGS. 1D and 4, at least a portion of the prime mover 104 may be located within the control tower 111 and at least a portion of the prime mover 104 may extend forward from the control tower 111. Further, at least a portion of the prime mover 104 (e.g., an uppermost portion 190 of the prime mover 104) may be above an elevation (e.g., relative to the ground surface 103) of an uppermost surface 129 of the cover 120, when in the closed position. In other words, the uppermost surface 129 of the cover 120, when in the closed position, may be below an elevation of the uppermost surface 192 of the prime mover 104. In one or more embodiments, it may be described that the upper most surface 129 of the cover 120 is positioned halfway or three-fourths way up the prime mover 104 (e.g., covering from a lower portion of the prime mover 104 to about 50% or 75% upwards).

In one or more embodiments, the cover 120 may define one or more vent openings 128, e.g., as shown in FIGS. 1B and 3A. The one or move vent openings 128 may provide fluid communication of air between components underneath the cover 120 and the external environment when the cover 120 is in the closed position. The one or more vent openings 128 may include any number of suitable openings located at any suitable position. For example, as shown in FIG. 3A, the vent openings 128 are positioned on sides of the cover 120 proximate the first and second recesses 151, 152 and between the recesses 151, 152 and the channel 154.

In one or more embodiments, the mower 100 may also include a latch configured to removably couple the cover 120 and the chassis 102. For example, the latch may be located on the cover 120 opposite the pivot axis 125 (e.g., proximate the rear-end region 124 of the cover 120) such that the cover 120 may be coupled to the chassis 102 at least at two opposing points (e.g., pivotally coupled proximate the front-end region 122 of the cover 120 and removably coupled at the rear-end region 124 of the cover 120). In other embodiments, the cover 120 may be toollessly movable between the open and closed position relative to the chassis 102 such that, e.g., the weight of the cover 120 may be sufficient to keep the cover 120 in the closed position.

Illustrative embodiments are described and reference has been made to possible variations of the same. These and other variations, combinations, and modifications will be apparent to those skilled in the art, and it should be understood that the claims are not limited to the illustrative embodiments set forth herein.

What is claimed is:

1. A stand-up grounds maintenance vehicle comprising:
a chassis supported upon a ground surface by a plurality of ground-engaging members and extending along a longitudinal axis between a front end and a rear end;
a control tower coupled to the chassis proximate the rear end;
an implement attached to the chassis and positioned at least partially forward of the control tower, wherein the implement comprises an implement drive; and
a cover extending over the implement drive and pivotally coupled to the chassis, wherein the cover is configurable between a closed position and an open position, wherein a portion of the implement is covered when the cover is in the closed position and the portion of the implement is exposed when the cover is in the open position.

2. The vehicle of claim 1, wherein the cover extends between a front-end region and a rear-end region, wherein the front-end region of the cover is pivotally coupled to the chassis.

3. The vehicle of claim 1, further comprising a prime mover, wherein at least a portion of the prime mover is located within the control tower.

4. The vehicle of claim 3, wherein at least a portion of the prime mover is above an elevation of an uppermost surface of the cover, when in a closed position.

5. The vehicle of claim 1, wherein the cover is configured to toollessly remain in the open position and toollessly remain in the closed position.

6. The vehicle of claim 1, wherein the cover is configured to pivot relative to the chassis about a pivot axis, and wherein a center of weight distribution of the cover is configured to move through a vertical plane located at the pivot axis when moving from the closed position to the open position such that the cover remains in the open position.

7. The vehicle of claim 1, further comprising isolator elements configured to contact the cover and the chassis when the cover is in the closed position.

8. The vehicle of claim 1, further comprising one or more drive train components located between the implement and the cover when the cover is in the closed position.

9. The vehicle of claim 8, wherein the one or more drive train components comprise an exhaust system and an electric storage device.

10. The vehicle of claim 1, further comprising an operator support located aft of the control tower, wherein the operator support comprises a platform configured to support a standing operator.

11. A stand-up grounds maintenance vehicle comprising:
a chassis supported upon a ground surface by a plurality of ground-engaging members and extending along a longitudinal axis between a front end and a rear end;
a control tower coupled to the chassis proximate the rear end;
an implement attached to the chassis and positioned at least partially forward of the control tower;
one or more drive train components comprising a prime mover, an exhaust system, and an electric storage device, wherein the implement comprises an implement drive operably coupled to the prime mover; and
a cover pivotally coupled to the chassis proximate the front end of the chassis, and wherein the implement drive and at least one of the one or more drive train components are located between the implement and the cover when the cover is in a closed position.

12. The vehicle of claim 11, wherein at least a portion of the prime mover is located within the control tower, and wherein at least a portion of the prime mover is above an elevation of an uppermost surface of the cover, when in the closed position.

13. The vehicle of claim 11, wherein the cover is configurable between the closed position and an open position, wherein a portion of the implement is covered when the cover is in the closed position and the portion of the implement is exposed when the cover is in the open position.

14. The vehicle of claim 13, wherein the cover is configured to toollessly remain in the open position and toollessly remain in the closed position.

15. The vehicle of claim 13, wherein the cover is configured to pivot relative to the chassis about a pivot axis, and wherein a center of weight distribution of the cover is configured to move through a vertical plane located at the pivot axis when moving from the closed position to the open position such that the cover remains in the open position.

16. A stand-on or walk-behind lawn mower comprising:
   a chassis supported upon a ground surface by a plurality of ground-engaging members and extending along a longitudinal axis between a front end and a rear end;
   a control tower coupled to the chassis proximate the rear end;
   a prime mover coupled to the chassis;
   a deck attached to the chassis and positioned at least partially forward of the control tower, the deck comprising a deck drive operably coupled to the prime mover; and
   a cover extending over the deck drive and pivotally coupled to the chassis proximate the front end of the chassis, wherein at least a portion of the prime mover is above an elevation of an uppermost surface of the cover, when in a closed position.

17. The mower of claim 16, wherein at least a portion of the prime mover is located within the control tower, and wherein at least a portion of the prime mover is above an elevation of an uppermost surface of the cover, when in the closed position.

18. The mower of claim 16, wherein the cover is configurable between the closed position and an open position, wherein a portion of the deck drive is covered when the cover is in the closed position and the portion of the deck drive is exposed when the cover is in the open position.

19. The mower of claim 18, wherein the cover is configured to toollessly remain in the open position and toollessly remain in the closed position.

20. The mower of claim 18, wherein the cover is configured to pivot relative to the chassis about a pivot axis, and wherein a center of weight distribution of the cover is configured to move through a vertical plane located at the pivot axis when moving from the closed position to the open position such that the cover remains in the open position.

21. The mower of claim 18, further comprising one or more drive train components located between the deck and the cover when the cover is in the closed position.

22. The mower of claim 21, wherein the one or more drive train components comprise an exhaust system and an electric storage device.

\* \* \* \* \*